(No Model.)

G. C. OVERHISER.
HAIR PIN.

No. 348,138.        Patented Aug. 24, 1886.

Witnesses:  
A. S. Hyer  
L. Seward Bacon.

Inventor:  
George C. Overhiser  
By    _____  
Atty.

United States Patent Office.

GEORGE C. OVERHISER, OF IONIA, MICHIGAN.

HAIR-PIN.

SPECIFICATION forming part of Letters Patent No. 348,138, dated August 24, 1886.

Application filed April 30, 1886. Serial No. 200,673. (No model.)

*To all whom it may concern:*

Be it known that I, GEORGE C. OVERHISER, a citizen of the United States, residing at Ionia, in the county of Ionia and State of Michigan, have invented certain new and useful Improvements in Hair-Pins; and I do hereby declare the following to be a full, clear, and exact description of the invention, such as will enable others skilled in the art to which it appertains to make and use the same.

My invention relates to hair-pins; and it consists in the construction and arrangement of the parts, which will be more fully hereinafter described, and pointed out in the claims.

The object of my invention is to provide a hair-pin which may be readily and conveniently used, and when used will securely remain in the position in which it is placed without injury to the hair of the wearer. I attain this object by the device illustrated in the accompanying drawings, wherein like letters of reference indicate similar parts in the several views, and in which—

Figure 1:
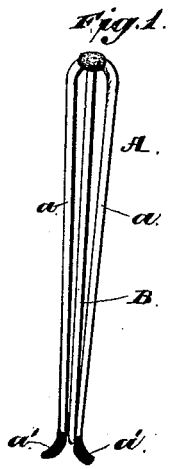
Figure 2:
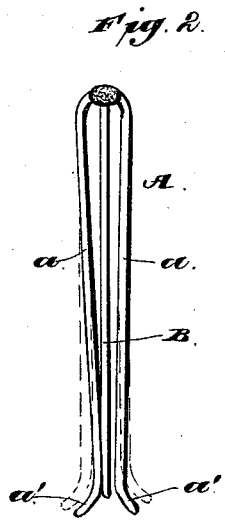

Figure 1 is a front elevation of my improved hair-pin. Fig. 2 is a front elevation of the same, with the prongs spread apart in dotted lines.

A indicates an elastic wire, of any suitable material, bent or arranged so as to form two tines or prongs, *a a*, the ends *a' a'* being so constructed as to approach, touch, or nearly touch each other. This portion of the pin is formed of one piece of wire, either flat or round, the ends *a'* being loaded to aid them in keeping their position, or constructed of wire which, by reason of its resiliency, has a natural tendency to preserve the form into which it is bent.

Secured to the upper curved part of the main portion A of the pin, by soldering, coiling, or by any other suitable means, is a piece, B, which is straight from end to end, and is formed somewhat shorter than the two outer tines, *a a*, thus allowing the points of the outer tines to extend below the point of the central piece or prong, B. The ends *a' a'* of the outer tines, when formed of round wire, are slightly flattened on their inner sides and bent or flared outward from the central tine or prong, forming an open mouth for the easy and ready reception of the hair.

When the pin is inserted in the hair, the spreading or open space below the curve and above the point where the tines approach or touch each other receives the hair pressed into the mouth of the pin, and in connection with the resilient effort of the outer tines or prongs bearing against or toward the inner tine holds the pin firmly in place until it is desired to withdraw the same.

As hereinbefore stated, the pin may be constructed of any suitable material, and be reenforced to keep it in a desired form, or have in itself sufficient elasticity to preserve such form. The central tine or prong may extend above the upper curve of the outer tines, and be ornamented or provided with suitable settings or heads.

This form of pin will not cut the hair, nor injuriously pull it, but will retain its place or position when used without danger of loss, and may be readily withdrawn when necessary.

Having thus described my invention, what I claim as new, and desire to secure by Letters Patent, is—

1. As an article of manufacture, a hair-pin having outer tines or prongs formed from one piece of elastic material, with lower flared and inwardly-flattened ends, and a central tine or prong of suitable material secured to the upper curve of the outer tines, but somewhat shorter than said tines, substantially as described.

2. In a hair-pin, the combination of the portion A, having tines or prongs *a a*, with lower bent or flared ends, *a' a'*, slightly flattened on the inside thereof, a central tine or prong, B, secured to the upper curve of said outer tines, and means for securing the central tine to the outer portion, A, substantially as described.

In testimony whereof I affix my signature in presence of two witnesses.

GEORGE C. OVERHISER.

Witnesses:
ETHAN T. MONTGOMERY,
ALEX. W. DODGE.